Dec. 25, 1956   J. C. MORRELL   2,774,984
LIP STICK AND APPLICATOR
Filed June 7, 1956
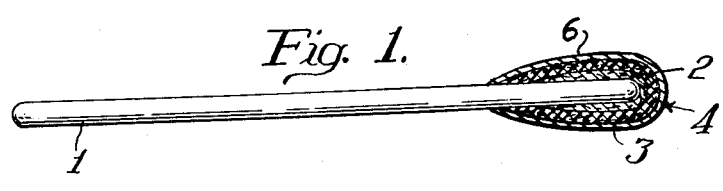
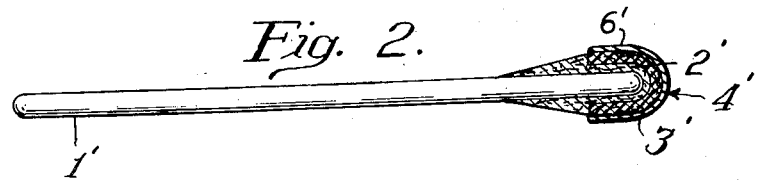
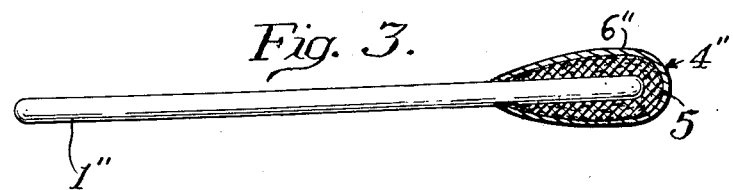
INVENTOR
Jacque C. Morrell United States Patent Office 2,774,984
Patented Dec. 25, 1956

2,774,984
LIP STICK AND APPLICATOR
Jacque C. Morrell, Chevy Chase, Md.
Application June 7, 1956, Serial No. 589,917
7 Claims. (Cl. 15—209)

This application is a continuation-in-part of my application Serial No. 662,327, filed April 15, 1946, now Patent No. 2,561,400, dated July 29, 1951, and of my application Serial No. 224,224, filed May 2, 1951, now abandoned. The latter application is to be abandoned in favor of the present continuation-in-part as well as to include in the continuation-in-part the subject-matter of certain amendments, particularly that dated April 28, 1953, and to make the claims therein conform to the remarks in this amendment.

This invention relates to cosmetics generally and more particularly it relates to a practical lip stick and prefabricated lip rouge applicator which is inexpensive and may be adapted to a single or multiple use, and for dispensing or marketing through automatic coin operated vending machines.

My novel lip stick may be packaged alone or in combination with other cosmetics, such as face power, etc., for one or more applications. A special object of my invention is the provision of a lip stick which is sanitary, of high quality, safe to use without injury to the lips, and practical for application or shaping to the lips. At the same time, my lip stick is economical to manufacture with high quality materials so that it may be sold at low cost, and may serve especially as an emergency and readily available unit or even be dispensed as an advertising item. My novel lip stick is prefabricated for distribution and use which is a particular advantage over the prior art.

Still further objects of my invention will be apparent from the detailed description given hereinafter, and by reference to the attached drawings, in which:

Figure 1 is a view of one modification of my lip stick applicator showing the lip rouge portion in section, Figure 2 is a view of another modification of my lip stick applicator showing the lip rouge portion in section, and Figure 3 is a view of still another modification of my lip stick applicator showing the lip rouge portion in section.

In the aforementioned Patent No. 2,561,400 and patent application Serial No. 224,224, of which the present application is a continuation-in-part, I disclosed my novel application which in general consist of a small individual lip sticks which in general consist of a small individual stick or rod made of wood, plastic, stiff cardboard or similar relatively stiff or rigid material which is covered or wrapped at one end with a soft absorbent, porous material, such as cotton, wool, absorbent paper, felt (and other soft fibrous material), sponge rubber and the like. These materials are in a relatively compact condition and have a more or less bulbous shape when applied to the rod. The materials used are not necessarily equivalents. The soft absorbent material is in turn impregnated with lip rouge at least in part, e. g. on the tip portion thereof. The soft absorbent material covering one end of the stick, because of impregnation by the normally semi-solid lip rouge, strengthens the latter and prevents crumbling, or breaking away of the lip rouge which would otherwise occur in use if the lip rouge were applied directly to the stick or rod. Other important functions are served by the cooperative effect of the soft absorbent material and the lip rouge as a result of impregnation by the latter, and these will be referred to below. For the above reason and to accomplish this important purpose of preventing crumbling, etc., of the lip rouge, it is inherent in my invention that the impregnation of the normally semi-solid lip rouge shall extend inwardly from the outer surface thereof to a substantial depth normally beyond that which would be reached by merely wiping up said lip rouge in its normally semi-solid state with said absorbent material. It will of course be understood that some neat lip rouge will be deposited on the outer surface of the bulbous shaped soft absorbent material in addition to substantial impregnation.

Referring in detail to the drawings, in Figure 1, rod or stick 1, which may be made of wood, plastic, stiff cardboard, or other stiff and/or rigid material, is covered at one end with the soft absorbent and porous material (cotton, absorbent paper, wool, sponge rubber, etc.) 2 and the latter is impregnated with lip rouge 3 to a substantial depth as shown qualitatively by the heavy cross-hatching. However, there is generally a layer of neat lip rouge 6 on the periphery of the bulbous shaped composite lip rouge element 4 of the lip stick. The thickness of this superimposed layer depends on the method of applying and the number of times the bulbous tip of the lip stick is dipped in the molten lip rouge and alternately cooled during preparation of the same. This operation will be referred to further below.

However, the impregnation, as stated previously, is substantial and acts to consolidate all of the lip rouge which is deposited on the end of the lip stick, stabilizing and strengthening it (roughly analogous to the roots of a tree) so that on application of the same it is prevented from crumbling and breaking under the pressure of applying and shaping to the lips.

Referring to Fig. 2, 1' represents the stick or rod, corresponding to 1 in Figure 1; 2' the soft absorbent material covering the end of the rod; and 3' the impregnated lip rouge; and 4' the composite bulbous element. The lip stick illustrated in Figure 2 differs from Figure 1 however in that while impregnation of the lip rouge is substantial, it extends only part of the length and depth of the bulbous element 4' of the lip stick, i. e. at least in part and at least on the tip of the same. Similarly to the modification shown in Figure 1, penetration of the rouge stops short of reaching the rod, i. e. the complete depth of the bulbous element. Neat lip rouge on the periphery is shown at 6'. In general, the modification shown in Figure 2 is preferred and the preferred absorbent material is cotton wool; also impregnation may be complete if desired.

In Figure 3, 1" represents the rod and 4" the composite bulbous element. In this modification, however, impregnation is substantially complete both with respect to depth and length of the soft absorbent and relatively compact composite bulbous lip rouge element of which the absorbent and lip rouge are mutually cooperating elements represented by 5. Neat lip rouge on the periphery is shown at 6".

Reverting to some details of applying the lip rouge, in the preparation of my lip stick the stiff rod for example made of wood is covered at one end, with an absorbent material for example by wrapping with an absorbent fibrous and/or soft porous material such as cotton wool. In some cases it may be desirable to place a small amount of adhesive on the tip of the rod before wrapping with the fibrous material. The wrapped end may be tipped and impregnated with lip rouge by dipping the same in melted lip rouge and the absorbent tip is thus covered and impregnated in whole or in part by the lip rouge. The lip rouge is then allowed to cool and harden. The thickness of the surface layer depends on the number of times this is repeated. As one of the special features of my novel lip stick, as indicated previously, the absorbent fibrous material such as cotton exerts a capillary action on the melted lip rouge because of the interstices and of the porous character generally of the cotton tip or bulbous end of the lip stick. The tip of soft absorbent material takes up sufficient of the lip rouge, and becomes impregnated with the same and forms a reservoir or reserve of lip rouge for one or more applications. Moreover, the absorbent material becomes embedded in the lip rouge (each mutually supporting the other) and provides an applicator adapted to apply lip rouge in a convenient and comfortable manner, and to accurately conform to the shape of the lips as well as to maintain a sufficient supply of lip rouge for one or more applications. The fibrous or other soft absorbent material thus acts as a carrier for the lip rouge and also avoids and prevents crumbling, or breaking away, of the lip rouge which otherwise occurs when the lip rouge is applied directly to the stick, and also functions to protect the lips from injury by the rod during application. The lip sticks may thus be used to apply lip rouge directly to the lips without further addition of lip rouge, or the necessity of carrying a bulk supply, and at the same time the lip rouge may be shaped to the lips as desired.

A variety of methods of production of my lip sticks may be employed. One method which I have found convenient has been to align the unimpregnated lip stick elements in rows arranged for example between two strips of paper or otherwise held in place, or racked up. The lip stick heads or bulbous elements are then dipped into shallow pans of molten lip rouge. Other methods of production have also been devised so that no problem exists in this respect. Softening and contamination of the lip rouge are avoided if the heads or bulbous ends are wrapped in metal foil or otherwise protected prior to distribution and use.

Lip rouge may consist of various mixtures of solids and semi-solid materials, such as cocoa butter, lanolin, stearic acid, glyceryl monostearate, cetyl alcohol and various proportions of softening agents comprising highly refined mineral and vegetable oils and a variety of high grade non-toxic colors and lakes and perfumes, as well as other specialized materials. As indicated previously, I may employ the very best selection of materials and finished lip rouge product because there is little waste and high economy in the use of my lip stick as well as a great demand for special occasions, especially emergency use.

I have described several modifications of my lip stick and other modifications will become apparent to those skilled in the art from the detailed description given herein. It is to be understood therefore that these are illustrative only and that my invention is limited only by the spirit and scope of my invention as defined by the appended claims.

I claim:

1. An individual prefabricated lip stick comprising a stiff rod, one end of said rod being covered with a soft porous absorbent material, the said absorbent material being in compact condition and of bulbous shape and being impregnated at least in part with normally semi-solid lip rouge extending inwardly from the outer surface thereof to a substantial depth normally beyond that which would be reached by wiping up said lip rouge in its normally semi-solid state with said absorbent material, whereby to support and to reduce crumbling of said lip rouge, said absorbent material being adapted to retain said lip rouge over an extended period between impregnation and use and said stiff rod being adapted for use as a handle in the application of said lip rouge.

2. An individual prefabricated lip stick comprising a stiff rod, one end of said rod being wrapped and covered with a soft porous absorbent fibrous material, the said absorbent material being in compact condition and of bulbous shape and being impregnated at least in the tip portion thereof with normally semi-solid lip rouge extending inwardly from the outer surface thereof to a substantial depth normally beyond that which would be reached by wiping up said lip rouge in its normally semi-solid state with said absorbent material, whereby to support and to reduce crumbling of said lip rouge and to minimize loosening of said fibrous material, said absorbent material being adapted to retain said lip rouge over an extended period between impregnation and use and said stiff rod being adapted for use as a handle in the application of said lip rouge.

3. An individual prefabricated lip stick comprising a stiff rod, one end of said rod being wrapped and covered with a soft porous absorbent material consisting of cotton, the said absorbent material being in compact condition and of bulbous shape and impregnated at least in the tip portion thereof with normally semi-solid lip rouge extending inwardly from the outer surface thereof to a substantial depth normally beyond that which would be reached by wiping up said lip rouge in its normally semi-solid state with said absorbent material, whereby to support and to reduce crumbling of said lip rouge, said absorbent material being adapted to retain said lip rouge over an extended period between impregnation and use, and said stiff rod being adapted for use as a handle in the application of said lip rouge.

4. An individual prefabricated lip stick comprising a stiff rod, one end of said rod being wrapped and covered with a soft porous absorbent material consisting of cotton, the said absorbent material being in compact condition and of bulbous shape and impregnated at least in part with normally semi-solid lip rouge extending inwardly from the outer surface thereof to a substantial depth normally beyond that which would be reached by wiping up said lip rouge in its normally semi-solid state with said absorbent material, whereby to support and to reduce crumbling of said lip rouge and to minimize loosening of said cotton, said absorbent material being adapted to retain said lip rouge over an extended period between impregnation and use, and said stiff rod being adapted for use as a handle in the application of said lip rouge.

5. An individual prefabricated lip stick comprising a stiff rod made of wood, one end of said rod being wrapped and covered with a soft porous absorbent material consisting of cotton, the said absorbent material being in compact condition and of bulbous shape and impregnated at least in the tip portion thereof with normally semi-solid lip rouge extending inwardly from the outer surface thereof to a substantial depth normally beyond that which would be reached by wiping up said lip rouge in its normally semi-solid state with said absorbent material, whereby to support and to reduce crumbling of said lip rouge and to minimize loosening of said cotton, said absorbent material being adapted to retain said lip rouge over an extended period between impregnation and use, and said stiff rod being adapted for use as a handle in the application of said lip rouge.

6. An individual prefabricated lip stick comprising a stiff rod made of plastic, one end of said rod being wrapped and covered with a soft porous absorbent material consisting of cotton, the said absorbent material being in compact condition and of bulbous shape and impregnated at least in the tip portion thereof with normally semi-solid lip rouge extending inwardly from the outer surface thereof to a substantial depth normally beyond that which would be reached by wiping up said lip rouge in its normally semi-solid state with said absorbent material, whereby to support and to reduce crumbling of said lip rouge and to minimize loosening of said cotton, said absorbent material being adapted to retain said lip rouge over an extended period between impregnation and use, and said stiff rod being adapted for use as a handle in the application of said lip rouge.

7. An individual prefabricated lip stick comprising a stiff rod, one end of said rod being covered with a soft porous absorbent material, the said absorbent material being in compact condition and of bulbous shape and being impregnated substantially to the maximum depth of said soft porous absorbent material with normally semi-solid lip rouge extending inwardly from the outer surface thereof to a substantial depth normally beyond that which would be reached by wiping up said lip rouge in its normally semi-solid state with said absorbent material, whereby to support and to reduce crumbling of said lip rouge, said absorbent material being adapted to retain said lip rouge over an extended period between impregnation and use and said stiff rod being adapted for use as a handle in the application of said lip rouge.

No references cited.